(12) United States Patent
Liu

(10) Patent No.: US 9,367,183 B2
(45) Date of Patent: Jun. 14, 2016

(54) DUAL-MODE TOUCH DEVICE

(71) Applicant: Hung-Ta Liu, Hsinchu County (TW)

(72) Inventor: Hung-Ta Liu, Hsinchu County (TW)

( * ) Notice: Subject to any disclaimer, the term of this patent is extended or adjusted under 35 U.S.C. 154(b) by 94 days.

(21) Appl. No.: 13/870,986

(22) Filed: Apr. 26, 2013

(65) Prior Publication Data

US 2013/0285979 A1  Oct. 31, 2013

(30) Foreign Application Priority Data

Apr. 27, 2012 (TW) .............................. 101115213 A

(51) Int. Cl.
*G06F 3/044* (2006.01)

(52) U.S. Cl.
CPC ........................................ *G06F 3/044* (2013.01)

(58) Field of Classification Search
CPC ........................................................ G06F 3/044
USPC ........................................................ 345/174
See application file for complete search history.

(56) References Cited

U.S. PATENT DOCUMENTS

| 2010/0123673 | A1 | 5/2010 | Nam | |
|---|---|---|---|---|
| 2010/0321208 | A1 | 12/2010 | Etchegoyen | |
| 2011/0025635 | A1 | 2/2011 | Lee | |
| 2011/0050627 | A1* | 3/2011 | Liao et al. ...................... | 345/174 |
| 2011/0181542 | A1* | 7/2011 | Yang ............................... | 345/174 |
| 2011/0310059 | A1* | 12/2011 | Miyamoto et al. ............. | 345/174 |
| 2012/0319966 | A1* | 12/2012 | Reynolds ................ | G06F 3/041 |
| | | | | 345/173 |
| 2013/0021283 | A1* | 1/2013 | Nishimura et al. ........... | 345/173 |
| 2013/0038568 | A1* | 2/2013 | Chang ............................ | 345/174 |
| 2013/0106781 | A1* | 5/2013 | Oh ........................... | G06F 3/044 |
| | | | | 345/174 |
| 2013/0241845 | A1* | 9/2013 | Hsu et al. ....................... | 345/173 |

FOREIGN PATENT DOCUMENTS

| CN | 101441538 | A | 5/2009 | |
|---|---|---|---|---|
| JP | 2003066417 | A | 3/2003 | |
| JP | 2011227793 | A | 11/2011 | |
| KR | 20040084503 | A | 10/2004 | |
| KR | 20100095886 | A | 9/2010 | |
| KR | 2011-0122707 | A | 11/2011 | |
| KR | 2011-0133094 | A | 12/2011 | |
| TW | M381837 | U1 | 6/2010 | |
| WO | WO 2011/125521 | | * | 10/2011 |
| WO | WO-2012008725 | A2 | * | 1/2012 |

* cited by examiner

*Primary Examiner* — Chanh Nguyen
*Assistant Examiner* — Daniel Duong
(74) *Attorney, Agent, or Firm* — CKC & Partners Co., Ltd.

(57) ABSTRACT

A touch device is provided. The touch device has a touch mode and a common-electrode mode. The touch device comprises a touch-sensing module, a common-electrode layer, second touch units, second wires, a common-potential circuit and switches. The common-electrode layer comprises first touch units and first wires for connecting first touch units and the touch-sensing module. The first and the second touch units are arranged in an interlace manner. The second wires connect the second touch units and the touch-sensing module. The switch is open during the touch mode such that the first and the second touch units detect, induct and transmit a touch signal to the touch-sensing module to determine a coordinate, strength and variation of a touch. The switch is close during the common-electrode mode such that the first touch units are connected to the common-potential circuit to be further connected to a common voltage.

10 Claims, 5 Drawing Sheets

DUAL-MODE TOUCH DEVICE

RELATED APPLICATIONS

This application claims priority to Taiwanese Application Serial Number 101115213, filed Apr. 27, 2012, which is herein incorporated by reference.

BACKGROUND

1. Field of Invention

The disclosure relates to a touch technology. More particularly, the disclosure relates to a touch device.

2. Description of Related Art

The touch technology is a highly intuitive input method, which can accomplish the input mechanism without the need of memorizing the position of the keys and the need of additional hardware. Therefore, with respect to either input convenience for a user or a manufacturing cost, the touch technology is more competitive than other input technologies of electronic devices. With the popularization of a smart phone and a tablet computer, the touch technology also becomes a main trend of the input technology.

However, the configuration of a touch module certainly will occupy a part of space of the electronic device. In a modern handheld electronic device pursuing a slim and lightweight form, any available space should be well utilized. Though the touch module brings a great convenience, an additional cost of space in the handheld electronic device increases as well. It is a great challenge for electronic device designers to figure out a method to reduce the impact of the space cost brought by the touch module to the lowest point.

Therefore, many in the industry are endeavoring to find ways in which to design a novel touch device to overcome the above issues.

SUMMARY

Therefore, an aspect of the disclosure provides a touch device. The touch device has a touch mode and a common-electrode mode. The touch device includes a touch-sensing module, a common-electrode layer, a plurality of second touch units, a plurality of second wires, a common-potential circuit and a plurality of switches. The common-electrode layer includes at least: a plurality of first touch units and a plurality of first wires. The first wires are used for connecting the first touch units and the touch-sensing module. The first and the second touch units are arranged in an interlace manner. The second wires are used for connecting the second touch units and the touch-sensing module. The plurality of switches are formed between the first wires and the common-potential circuit. The switch is open during the touch mode, such that the first touch units and the second touch units detect, induct and transmit a touch signal to the touch-sensing module to determine a coordinate, strength and variation of a touch. The switch is close during the common-electrode mode, such that the first touch units are connected to the common-potential circuit to be further connected to a common voltage.

According to an embodiment of the disclosure, the second touch units are located on the common-electrode layer, and the plurality of switches are also formed between the second wires and the common-potential circuit, and the switch is close during the common-electrode mode, such that the first and the second touch units are connected to the common-potential circuit to be connected to the common voltage.

According to another embodiment of the disclosure, the touch device further includes a thin film transistor layer, and the thin film transistor layer is used for providing a display frame according to a plurality of display data and a plurality of gate driving signals during the common-electrode mode. A hollow region is included between the first touch units and the second touch units, and the hollow region corresponds to a non-transparent zone of the thin film transistor layer. The switch may be formed outside the touch-sensing module or inside the touch-sensing module.

According to further embodiment of the disclosure, when the switch is close during the common-electrode mode, the first and the second touch units are connected to the common-potential circuit to be further connected to a ground voltage.

According to yet a further embodiment of the disclosure, the first touch units are divided into a plurality of first touch columns, and the first touch units in each of the first touch columns are connected in series with each other directly to be connected with the first wires by the first touch units at the outermost side.

According to still a further embodiment of the disclosure, the second touch units are divided into a plurality of second touch rows, and the second wires include a plurality of extension portions and a plurality of connection portions. The extension portion is correspondingly connected with one of the second touch units to extend outside the common-electrode layer. The connection portion is used for connecting the extension portion corresponding to the second touch units at one of the second touch rows to further be connected with the touch-sensing module and one of the switches. The connection portion is connected to the common-potential circuit on the thin film transistor layer parallel to the common-electrode layer. The connection portion and the extension portion are connected to the common-potential circuit by a silver paste, a gold or silver bump or an anisotropic conductive paste. The extension portion includes a first section and a second section. The first section is used for connecting with one of the second touch units to extend to an edge of the common-electrode layer. The second section is used for connecting the first section to the connection portion, and the first section and the second section are connected by the silver paste, the gold or silver bump or the anisotropic conductive paste.

According to still yet a further embodiment of the disclosure, the first touch units are column-directional strip touch units, triangular-like shape touch units or touch units arranged in an interlace manner.

According to an embodiment of the disclosure, a pattern is formed on the first touch units and the second touch units.

According to another embodiment of the disclosure, each of the first touch units is a forward-arranged triangle, and each of the second touch units is a backward-arranged triangle. Each of the forward-arranged triangles and the backward-arranged triangles includes a base edge and two side edges, and the two side edges include a trapezoidal structure.

According to a further embodiment of the disclosure, the first and the second touch units are formed through a photo etching process, a laser cutting process or a laser engraving process.

According to yet a further embodiment of the disclosure, the common-electrode layer is a first transparent electrode layer or a metal electrode layer. The common-electrode layer is formed at a first side of a glass substrate. The glass substrate further includes a second transparent electrode layer at a second side. The second touch units are located on the second transparent electrode layer, and the common-potential circuit and the switches are the thin film transistor or on an integrated circuit.

According to still a further embodiment of the disclosure, the touch device further includes a shape protection unit.

According to still yet a further embodiment of the disclosure, the common-potential circuit includes a common-voltage conducting wire.

An advantage of applying the disclosure is that the touch units are formed in the common-electrode layer and the touch units are switched to be connected with the touch-sensing module or the common-potential circuit by the switches, so as to have a common-electrode mechanism and a touch-sensing mechanism at the same time and reduce the cost to easily reach the above purposes.

BRIEF DESCRIPTION OF THE DRAWINGS

In order to make the foregoing as well as other aspects, features, advantages and embodiments of the disclosure more apparent, the accompanying drawings are described as follows.

DETAILED DESCRIPTION

Figure 1:
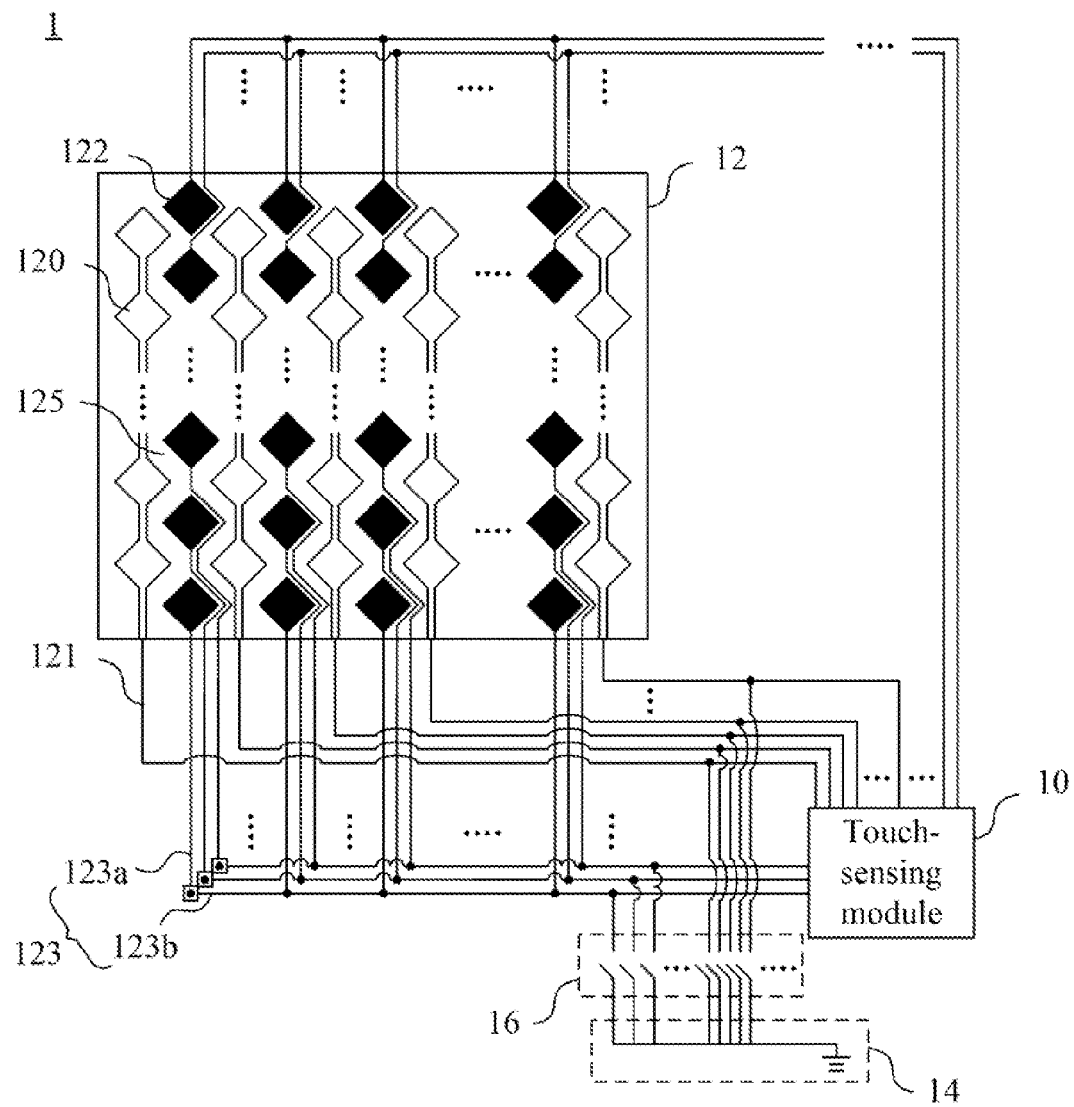
FIG. 1 is a top view of a touch device of an embodiment of the disclosure.

FIG. 1 is a top view of a touch device 1 of an embodiment of the disclosure. In this embodiment, the touch device 1 may operate in the touch mode and the common-electrode mode. The touch device 1 includes a touch-sensing module 10, a common-electrode layer 12, a common-potential circuit 14 and a plurality of switches 16.

In the present embodiment, the common-electrode layer 12 includes a plurality of first touch units 120, a plurality of second touch units 122, a plurality of first wires 121 and a plurality of second wires 123. In the present embodiment, the first touch units 120 and the second touch units 122 are arranged in an interlaced manner and each of which is a diamond touch unit.

In the present embodiment, the first touch units 120 are categorized into a plurality of first touch columns, and the first touch units 120 in the first touch columns are connected in series with each other directly to be connected with the first wires 121 by the first touch units 120 at the outermost side. Each of the first wires 121 is further connected with one of the switches 16.

In the present embodiment, the second touch units 122 are then categorized into a plurality of second touch rows. The second wires 123 each include an extension portion 123a and a connection portion 123b. The extension portion 123a is correspondingly connected with the second touch unit 122 to extend outside the common-electrode layer 12. One end of the connection portion 123b is connected to the extension portion 123a corresponding to the second touch units 122 in one of the second touch rows. Therefore, the second touch units 122 in one second touch row are substantially extended by the extension portions 123a and then substantially electrically connected in series by the connection portions 123b. The other end of the connection portion 123b is further connected with the touch-sensing module 10 and one of the switches 16. In one embodiment, the connection portion 123b and the extension portion 123a are connected by the silver paste, the silver bump or the anisotropic conductive paste to be further connected to the touch-sensing module 10 or the common-potential circuit 14.

The common-potential circuit 14 may be located on an external circuit board (not shown) in one embodiment. In the present embodiment, the common-potential circuit 14 is one common-voltage conducting wire for connecting to one specific voltage. In one embodiment, this specific voltage is the ground voltage. However, when the external circuit board at which the common-potential circuit 14 is located is in a same plane with the common-electrode layer 12, the interlaced extension portions 123a and connection portions 123b need to be bridged carefully to avoid an electrical connection among the second touch units 122 of different second touch rows.

In different embodiments, the switches 16 may be formed outside the touch-sensing module 10 and located among the first and the second wires 121, 123, the common-potential circuit 14 and the touch-sensing module 10, or may be formed inside the touch-sensing module 10.

In one embodiment, the switches 16 may receive one switching signal to switch between the touch mode and the common-electrode mode. This switching signal may be generated according to a control circuit (not shown) in the touch device 1. The switch 16 is open during the touch mode. Therefore, the switches 16 during the touch mode enable the first touch units 120 and the second touch units 122 to be not connected with the common-potential circuit 14, but detect, induct and transmit the touch signal generated by contacting with a touch object (not shown) on the first touch units 120 and the second touch units 122 to the touch-sensing module 10 to determine a coordinate, strength and variation of the touch.

The switch 16 is close during the common-electrode mode. Therefore, the switch 16 during the common-electrode mode enables the first touch units 120 and the second touch units 122 to be connected with the common-potential circuit 14 to be connected to the common voltage. In one embodiment, the common-potential circuit 14 enables the first touch units 120 and the second touch units 122 to be connected together to the ground voltage.

Therefore, the common-electrode layer 12 during the touch mode can enable the first touch units 120 and the second touch units 122 on the common electrode layer 12 to perform a touch-detecting mechanism, and during the common-electrode mode the first touch units 120 and the second touch units 122 on the common-electrode layer 12 are connected to the common voltage by the common-potential circuit 14.

Figure 2:
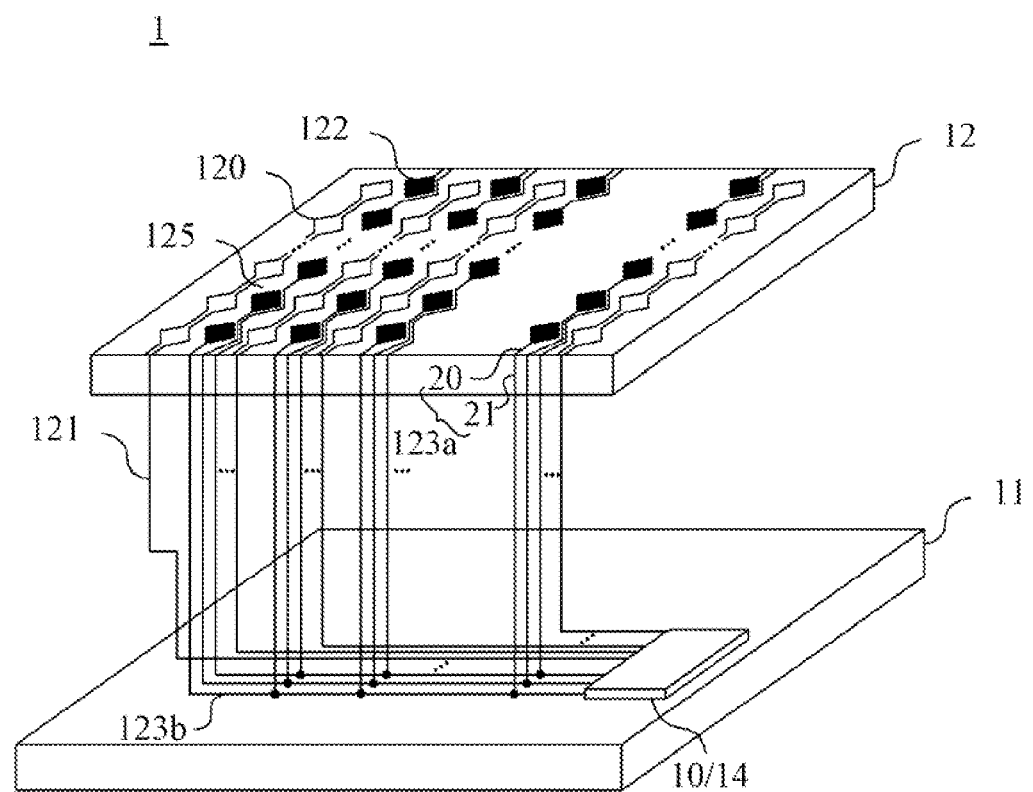
FIG. 2 is a perspective view of a touch device of an embodiment of the disclosure.

Referring to FIG. 2, it is a perspective view of the touch device 1 of an embodiment of the disclosure. In the present embodiment, in addition to including the common-electrode layer 12, the touch device 1 further includes a thin film transistor layer 11 corresponding to the common-electrode layer 12. The thin film transistor layer 11 is used for providing a display frame according to a plurality of display data and a plurality of gate driving signals during the common-electrode mode. The display data and the gate driving signals can be generated by a timing controller, a gate driving module, and a source driving module (not shown). Therefore, this touch device 1 may serve as one touch panel to reach the effect of saving the space and the manufacturing cost in the case that the common-electrode layer 12 thereof has the touch mechanism and the common-electrode mechanism at the same time. In the case that the touch device 1 is the touch panel, a hollow region 125 included between the first touch units 120 and the second touch units 122 may correspond to the non-transparent zone of the thin film transistor layer 11.

In the present embodiment, the common-potential circuit 14 is actually configured on the thin film transistor layer 11. As described above, the common-potential circuit 14 and the touch-sensing module 10 may be integrated into a single circuit block. The extension portion 123a of the second wire 123 includes a first section 20 and a second section 21. The first section 20 is used to connect with the second touch unit 122 to extend to the edge of the common-electrode layer 12. The second section 21 is used to connect the first section 20 to the connection portion 123b, and the first section 20 and the second section 21 may also be connected by the silver paste, the gold bump, the silver bump or the anisotropic conductive paste. By the design manner in FIG. 2, the extension portion 123a and the connection portion 123b may avoid the electrical connection problem among the second touch units of different second touch rows without being bridged.

Figure 3A:
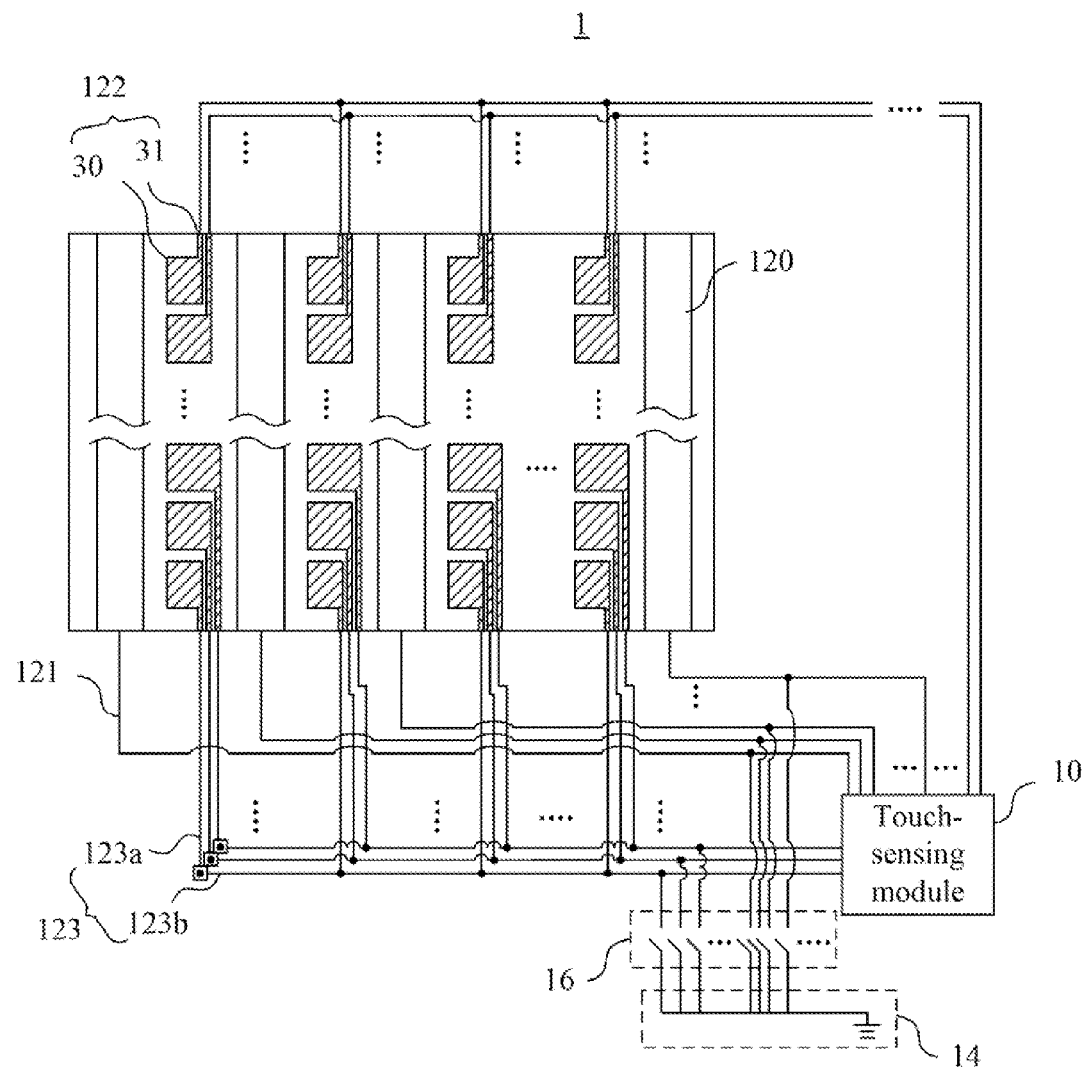
FIG. 3A is a top view of a touch device of an embodiment of the disclosure.
Figure 3B:
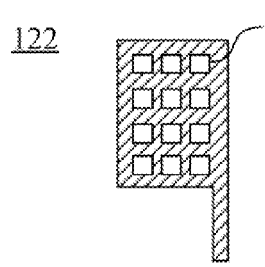
FIGS. 3B and 3C are respectively enlarged top views of a second touch unit of an embodiment of the disclosure.
Figure 3C:
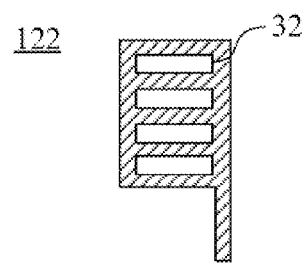

Referring to FIG. 3A, it is a top view of the touch device 1 in an embodiment of the disclosure. In the present embodiment, the first touch unit 120 is the column-directional strip touch unit, while the second touch unit 122 is a bulk touch unit and has a main body 30 and an extension body 31. A square-shape pattern or a long-strip pattern may be formed on the main body 30 of the second touch unit 122. Similarly, the first wires 121 and the second wires 123 may also be used for connecting the first touch units 120 and the second touch units 122 to the switches 16, and the connection between the first touch units 120 and the second touch units 122 and the touch-sensing module 10 or the common-potential circuit 14 is further controlled by the switches 16, so as to achieve the mechanism of touch detecting and common voltage. Referring to FIGS. 3B and 3C at the same time, they are respectively enlarged top views of the second touch unit 122 of an embodiment of the disclosure. In one embodiment, a hollow pattern 32 with a square shape, a rectangular shape or other shapes may be formed on the second touch unit 122 as shown in FIGS. 3B and 3C. Similarly, the hollow pattern may also be formed on the first touch unit 120 to provide a better sensing effect.

Figure 4A:
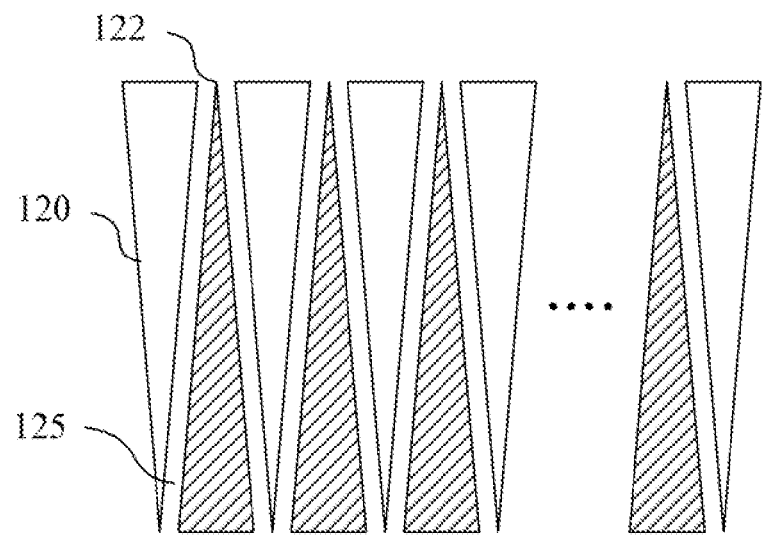
FIGS. 4A and 4B are respectively top views of a first touch unit and a second touch unit of the touch device of an embodiment of the disclosure.
Figure 4B:
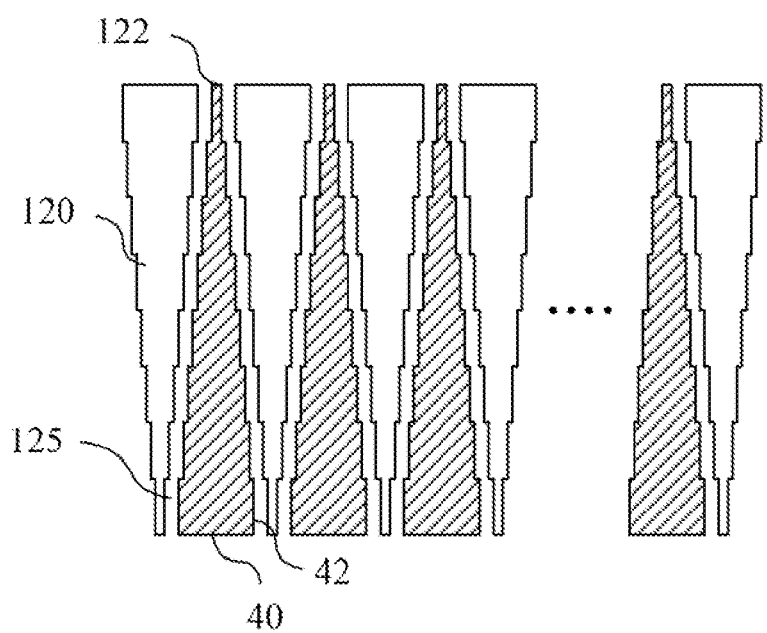

Referring to FIGS. 4A and 4B, they are respectively top views of the first touch unit 120 and the second touch unit 122 of the touch device 1 of an embodiment of the disclosure. In the embodiment of FIG. 4A, the first touch unit 120 is a forward-arranged triangle, while the second touch unit 122 is a backward-arranged triangle. Each of the first touch units 120 and the second touch units 122 can be sensed by width corresponding to different positions on the touch unit at which the touch signal thereof is located. Therefore, the number of the first touch units 120 and the second touch units 122 are decreased greatly compared to the embodiment in FIG. 1. In this situation, the number of the second wires 123 is also reduced as the number of the second touch units 122 is decreased. In the embodiment of FIG. 4B, the first touch unit 120 is also the forward-arranged triangle, and the second touch unit 122 is the backward-arranged triangle. The triangle includes a base edge 40 and two side edges 42. In the present embodiment, the two side edges 42 of the triangle further form a trapezoidal structure.

Figure 5:
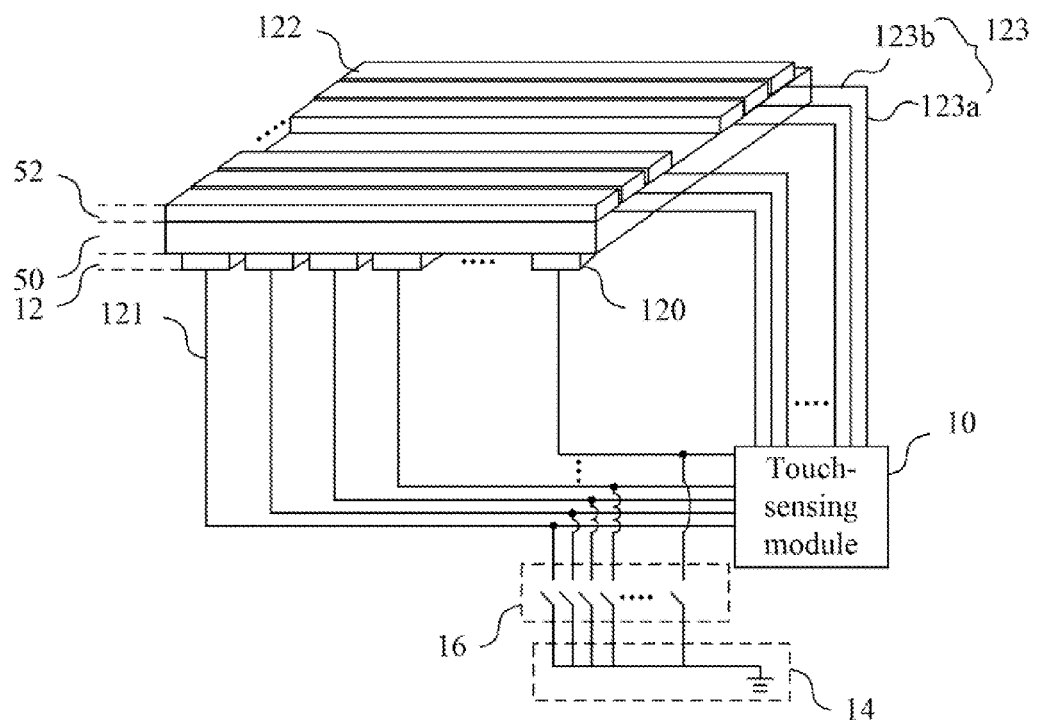
FIG. 5 is a perspective view of a touch device of another embodiment of the disclosure.

Referring to FIG. 5, it is a perspective view of the touch device 1 in another embodiment of the disclosure. In the embodiment, the common-electrode layer 12 is formed at the first side of a glass substrate 50, and the common-electrode layer 12 is a first transparent electrode layer or a metal electrode layer. The glass substrate 50 substantially further includes a second transparent electrode layer 52 at the second side.

The first transparent electrode layer as the common-electrode layer 12 includes strip first touch units 120 extending along a specific direction, and the strip first touch units 120 are connected with the common-potential circuit 14 or the touch-sensing module 10 by the switches 16 along the first wires. In one embodiment, the first touch units 120 on this common-electrode layer 12 should be distributed on the whole plane as much as possible to form a common-electrode plane.

The second transparent electrode layer 52 may form the second touch units 122 extending along another direction. In the present embodiment, the second touch units 122 may be optionally connected with the common-potential circuit 14 or the touch-sensing module 10 by the switches 16, or may be connected only with the touch-sensing module 10 without configuring the switches 16. In the first situation, the second transparent electrode layer 52 also serves as another common-electrode layer, while in the second situation, the second transparent electrode layer 52 is only used for touch sensing.

Figure 6:
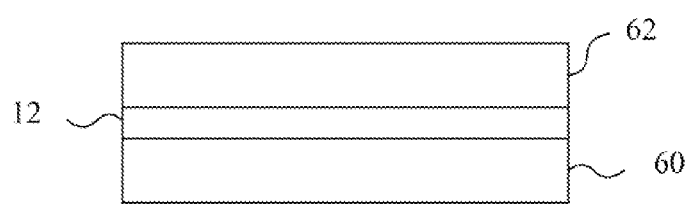
FIG. 6 is a side view of a touch device of another embodiment of the disclosure.

Referring to FIG. 6, it is a side view of the touch device 1 of another embodiment of the disclosure. In the present embodiment, the common-electrode layer 12 may be formed on one substrate 60. This substrate 60 may be a plastic substrate or glass substrate. The first and the second touch units 120 and 122 may be formed by a photo etching process, a laser cutting process or a laser engraving process. One shape protection unit 62 may be further formed on the common-electrode layer 12. This shape protection unit 62 and the common-electrode layer 12 may form one touch pad together. In one embodiment, the shape protection unit 62 is a protective glass or a strengthening glass. When the touch device 1 is a touch displayer, the shape protection unit 62 may be disposed on the displayer and have a larger range than a visible area, which may contain a button area, a touch area and the like, and an ink pattern or icon and the like may be formed in an inner side of the shape protection unit 62 to enable the shape of the touch device 1 to be more smooth and protect the touch device 1 at the same time.

The advantage of the disclosure is that the touch units are formed in the common-electrode layer and the touch units are switched to be connected with the touch-sensing module or the common-potential circuit by the switches, so as to have the common-electrode mechanism and the touch-sensing mechanism at the same time and reduce the cost. Moreover, the touch device of the disclosure can further reduce process steps and reduce a thickness, which is appropriate for a large area manufacturing.

Although the disclosure has been disclosed with reference to the embodiments, these embodiments are not intended to limit the disclosure. It will be apparent to those of skills in the art that various modifications and variations can be made without departing from the spirit and scope of the disclosure. Therefore, the scope of the disclosure should be defined by the appended claims.

What is claimed is:

1. A touch device having a touch mode and a common-electrode mode, wherein the touch device comprises:
   a touch-sensing module on a thin film transistor layer;
   a common-electrode layer parallel to and over the thin film transistor layer, comprising:
      a plurality of first touch units;
      a plurality of first wires, wherein the first touch units are divided into a plurality of first touch columns, and the first touch units in each of the first touch columns are directly connected in series with each other, each of the first touch columns is connected to one of the first wires by one of the first touch units at the outermost side for connecting with the touch-sensing module on the thin film transistor layer;

a plurality of second touch units, wherein the plurality of second touch units and the first touch units are arranged in an interlace manner; and a plurality of second wires for connecting the second touch units with the touch-sensing module, wherein the second touch units are divided into a plurality of second touch rows, and each of the second wires comprises:

a plurality of extension portions, wherein each of the second touch units in each of the second touch rows is correspondingly connected to only one of the extension portions, and the extension portions extend outside the common-electrode layer; and a connection portion disposed on the thin film transistor layer for connecting the extension portions to the touch-sensing module, the second touch units in each of the second touch rows are connected together through the connection portion, wherein the extension portions do not cross over the first wires on the common-electrode layer and the thin film transistor layer;

a common-potential circuit;

a plurality of switches respectively formed between the first wires and the common-potential circuit and between the second wires and the common-potential circuit; and a thin film transistor layer parallel to the common-electrode layer, wherein the thin film transistor layer is used for providing a display frame according to a plurality of display data and a plurality of gate driving signals during the common-electrode mode, wherein a hollow region is comprised between the first touch units and the second touch units, and the hollow region corresponds to a non-transparent zone of the thin film transistor layer, wherein the plurality of switches are open during the touch mode, such that the first touch units and the second touch units detect, induct and transmit a touch signal to the touch-sensing module to determine a coordinate, strength and variation of a touch;

the switches are close during the common-electrode mode, such that the first touch units are connected to the common-potential circuit to be connected to a common voltage.

2. The touch device of claim 1, wherein the switch may be formed outside the touch-sensing module or inside the touch-sensing module.

3. The touch device of claim 1, wherein when the switches are close during the common-electrode mode, the first and the second touch units are connected with the common-potential circuit to be further connected to a ground voltage.

4. The touch device of claim 1, wherein the connection portions are connected to the common-potential circuit on the thin film transistor layer parallel to the common-electrode layer.

5. The touch device of claim 1, wherein the connection portions and the extension portions are connected to the common-potential circuit by a silver paste, a silver bump or an anisotropic conductive paste.

6. The touch device of claim 1, wherein the extension portions each comprise a first section and a second section, and the first section is used for connecting with one of the second touch units to extend to an edge of the common-electrode layer, and the second section is used for connecting the first section to the connection portion, and the first section and the second section are connected by a silver paste, a silver bump or a anisotropic conductive paste.

7. The touch device of claim 1, wherein each of the first touch units is a column direction strip touch unit, a triangular-like shape touch unit or a touch unit arranged in an interlace manner.

8. The touch device of claim 1, wherein the first and the second touch units are formed by a photo etching process, a laser cutting process or a laser engraving process.

9. The touch device of claim 1, wherein the touch device further comprises a shape protection unit.

10. The touch device of claim 1, wherein the common-potential circuit comprises a common-voltage conducting wire.

* * * * *